United States Patent
Maruyama et al.

(10) Patent No.: US 12,118,164 B2
(45) Date of Patent: Oct. 15, 2024

(54) TOUCH PANEL SYSTEM, DISPLAY DEVICE, AND METHOD FOR CONTROLLING TOUCH PANEL FOR DETECTING POSITION AND PRESSURE OF INPUT

(71) Applicant: Sharp Display Technology Corporation, Kameyama (JP)

(72) Inventors: Takenori Maruyama, Kameyama (JP); Kazutoshi Kida, Kameyama (JP); Shinji Yamagishi, Kameyama (JP); Takuma Yamamoto, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/128,214

(22) Filed: Mar. 29, 2023

(65) Prior Publication Data
US 2023/0315233 A1 Oct. 5, 2023

(30) Foreign Application Priority Data
Mar. 31, 2022 (JP) ................. 2022-060997

(51) Int. Cl.
*G06F 3/041* (2006.01)
*G06F 3/044* (2006.01)

(52) U.S. Cl.
CPC .......... *G06F 3/0418* (2013.01); *G06F 3/0445* (2019.05); *G06F 3/0446* (2019.05); *G06F 2203/04105* (2013.01); *G06F 2203/04107* (2013.01)

(58) Field of Classification Search
CPC . G06F 2203/04105; G06F 2203/04107; G06F 3/0418; G06F 3/0445; G06F 3/0446
See application file for complete search history.

(56) References Cited

U.S. PATENT DOCUMENTS

| | | | |
|---|---|---|---|
| 2018/0136785 A1* | 5/2018 | Maruyama | G02F 1/134309 |
| 2020/0192525 A1* | 6/2020 | Li | G06F 3/0446 |
| 2021/0041973 A1* | 2/2021 | Ebisui | G06F 3/044 |
| 2021/0165521 A1* | 6/2021 | Yang | G06F 3/0418 |
| 2022/0171463 A1* | 6/2022 | Chen | G06F 3/016 |
| 2022/0171489 A1* | 6/2022 | Nathan | G06F 3/0443 |

FOREIGN PATENT DOCUMENTS

| | | |
|---|---|---|
| JP | 2012-043394 A | 3/2012 |
| JP | 2015-075892 A | 4/2015 |
| JP | 2017-049659 A | 3/2017 |

* cited by examiner

*Primary Examiner* — Chun-Nan Lin
(74) *Attorney, Agent, or Firm* — ScienBiziP, P.C.

(57) ABSTRACT

A touch panel system includes a capacitive touch panel and a controller that controls the touch panel. The touch panel includes a plurality of drive electrodes and a plurality of floating island electrodes located on a first substrate and a plurality of pressure detection electrodes and a plurality of position detection electrodes located on a second substrate. The controller provides a drive signal to the drive electrodes and corrects a pressure detection signal obtained from each of the pressure detection electrodes by using a position detection signal obtained from the position detection electrode.

13 Claims, 10 Drawing Sheets

TOUCH PANEL SYSTEM, DISPLAY DEVICE, AND METHOD FOR CONTROLLING TOUCH PANEL FOR DETECTING POSITION AND PRESSURE OF INPUT

BACKGROUND

1. Field

The present disclosure relates to a touch panel system, a display device, and a method for controlling a touch panel.

2. Description of the Related Art

In recent years, touch panels have been widely used in smartphones, tablets, instrument panels of automobiles, and the like. Japanese Unexamined Patent Application Publication No. 2015-75892 describes a touch panel that detects the position of a pointer, such as a finger or a pen, and the pressure level on the touch panel.

The touch panel described in Japanese Unexamined Patent Application Publication No. 2015-75892 includes a pyroelectric body, and the touch panel detects the position the finger is getting closer using the pyroelectric effect of the pyroelectric body and detects the pressure of the finger using the piezoelectric effect of the pyroelectric body. Therefore, even when a heat generating object other than a finger gets closer to the touch panel, the touch panel may erroneously detect the approach of the heat generating object as the approach of a finger. Conversely, if the temperatures of the pyroelectric body of the touch panel and the finger are almost the same, it is difficult to obtain the pyroelectric effect, which may make the touch panel difficult to detect the position of the finger.

The present disclosure provides a touch panel system, a display device, and a method for controlling a touch panel capable of detecting the position and pressure while reducing the influence of finger heat and ambient heat.

SUMMARY

According to an aspect of the present disclosure, a touch panel system includes a capacitive touch panel and a controller configured to control the touch panel. The touch panel includes a first substrate, a second substrate, a first dielectric layer located between the first substrate and the second substrate, a plurality of drive electrodes located on the first substrate, a plurality of floating island electrodes located on the first substrate, a plurality of pressure detection electrodes located on the second substrate, and a plurality of position detection electrodes located on the second substrate. Each of the drive electrodes overlaps at least part of a corresponding one of the pressure detection electrodes, and each of the floating island electrodes overlaps at least part of a corresponding one of the position detection electrodes in plan view. The controller provides a drive signal to the drive electrodes and corrects a pressure detection signal obtained from each of the pressure detection electrodes by using a position detection signal obtained from the position detection electrode.

According to another aspect of the present disclosure, a method for controlling a touch panel is provided. The touch panel is a capacitive touch panel. The touch panel includes a first substrate, a second substrate, a first dielectric layer located between the first substrate and the second substrate, a plurality of drive electrodes located on the first substrate, a plurality of floating island electrodes located on the first substrate, a plurality of pressure detection electrodes located on the second substrate, and a plurality of position detection electrodes located on the second substrate. Each of the drive electrodes overlaps at least part of a corresponding one of the pressure detection electrodes in plan view, and each of the floating island electrodes overlaps at least part of a corresponding one of the position detection electrodes in plan view. The method includes providing a drive signal to the drive electrodes and correcting a pressure detection signal obtained from each of the pressure detection electrodes by using a position detection signal obtained from the position detection electrode.

DESCRIPTION OF THE EMBODIMENTS

Exemplary embodiments of the present disclosure are described below with reference to the accompanying drawings. The present disclosure is not limited to the embodiments described below, and design changes can be made as appropriate within the scope of satisfying the configuration of the present disclosure. Furthermore, in the following description, the same reference numerals in different drawings identify the same elements or elements having similar functions. In this case, description of the element may not be repeated. In addition, the configurations described in the embodiments and other embodiments may be appropriately combined or changed without departing from the scope of the present disclosure. For ease of understanding, in the drawings cited below, the configuration may be illustrated in a simplified or schematic form, or some constituent members may be omitted. The dimensional ratios between the constituent members illustrated in the drawings do not necessarily indicate the actual dimensional ratios. The term "row direction" refers to the horizontal direction (the x direction) of the screen of the display device, and the term "column direction" refers to the vertical direction (the y direction) of the screen of the display device. In addition, in the drawings cited below, a variety of electrodes are indicated with hatchings to make them easier to identify.

First Embodiment

Figure 1:
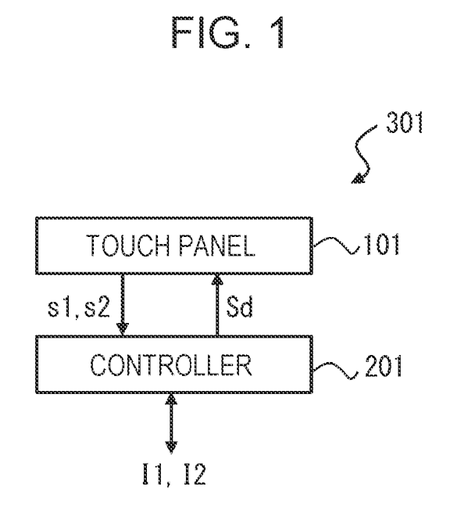
FIG. 1 is a block diagram of the configuration of a touch panel system according to a first embodiment.

FIG. 1 is a block diagram of the configuration of a touch panel system 301 according to the first embodiment. The touch panel system 301 includes a touch panel 101 and a controller 201. The touch panel 101 is configured as a capacitive touch panel. More specifically, the touch panel 101 is configured to receive a drive signal Sd from the controller 201 and output a signal s1 indicating a capacitance change related to the position of a pointer and a signal s2 indicating a capacitance change related to the pressure applied by the pointer.

The controller 201 provides the drive signal Sd to the touch panel 101, detects the signal s1 and the signal s2 as a position detection signal and a pressure detection signal, respectively, and corrects the pressure detection signal by using the position detection signal. In addition, the controller 201 outputs position information I1 and pressure information I2 from the position detection signal and the corrected pressure detection signal, respectively.

Figure 2:
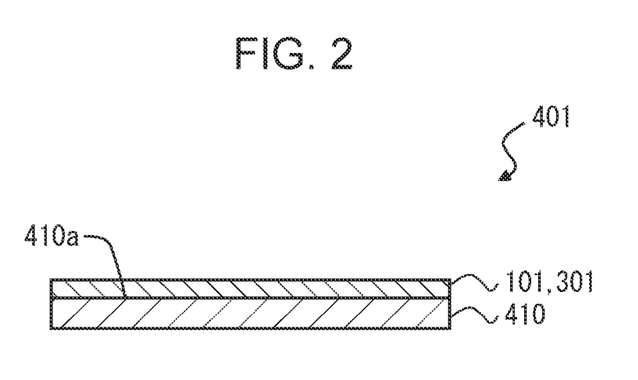
FIG. 2 is a schematic cross-sectional view of the configuration of a display device including the touch panel system.

FIG. 2 is a schematic cross-sectional view of the configuration of a display device 401 including the touch panel system 301. The display device 401 includes the touch panel system 301 and a display 410. The display 410 displays an image on a display surface 410a. The touch panel 101 of the touch panel system 301 is disposed on the display surface 410a. The display 410 is, for example, a liquid crystal display or an organic electroluminescence (EL) display.

An operator touches a specific position on the surface of touch panel 101 with a pointer, such as a finger or a stylus pen, in accordance with information displayed on the display surface 410a. The touch panel system 301 detects the touch position and the pressure level and outputs the position information I1 and the pressure information I2. The output information is input to a control device, such as a microcomputer, that controls a smartphone, a mobile terminal, or a car navigation system including the display device 401 and is used to control an image displayed by the display device 401 and control these devices. As described in detail below, the touch panel system 301 according to the present embodiment reduces the occurrence of erroneous detection by reducing the influence of heat due to the temperature of the use environment of the touch panel 101 or the temperature difference between the use environment and the pointer. The configuration of the touch panel system 301 and the operation performed by the touch panel system 301 are described in detail below.

Structure of Touch Panel

Figure 3:
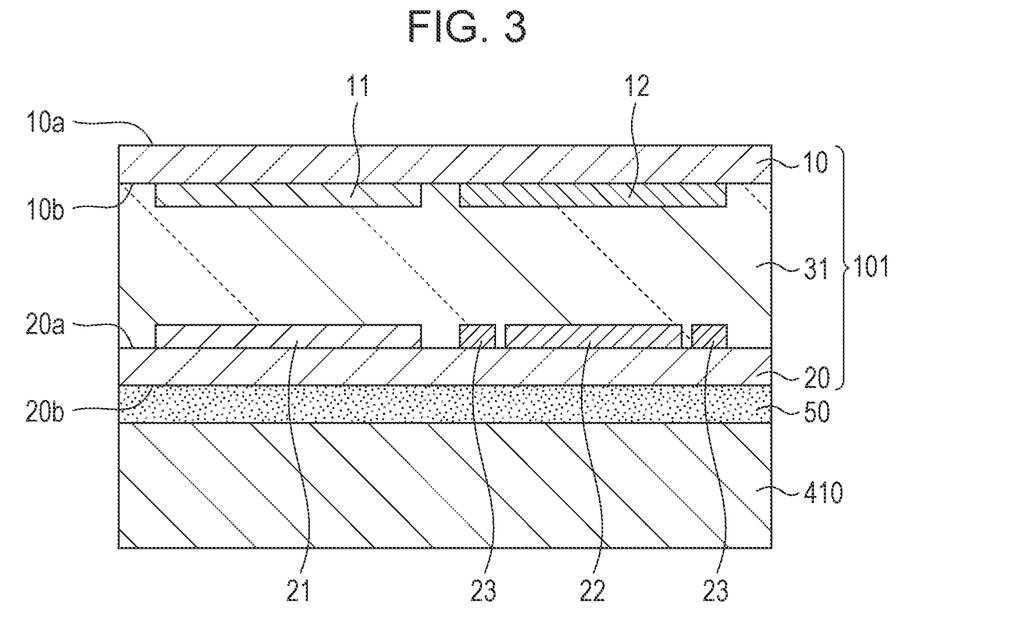
FIG. 3 is a schematic illustration of the cross-sectional structure of a touch panel.
Figure 4:
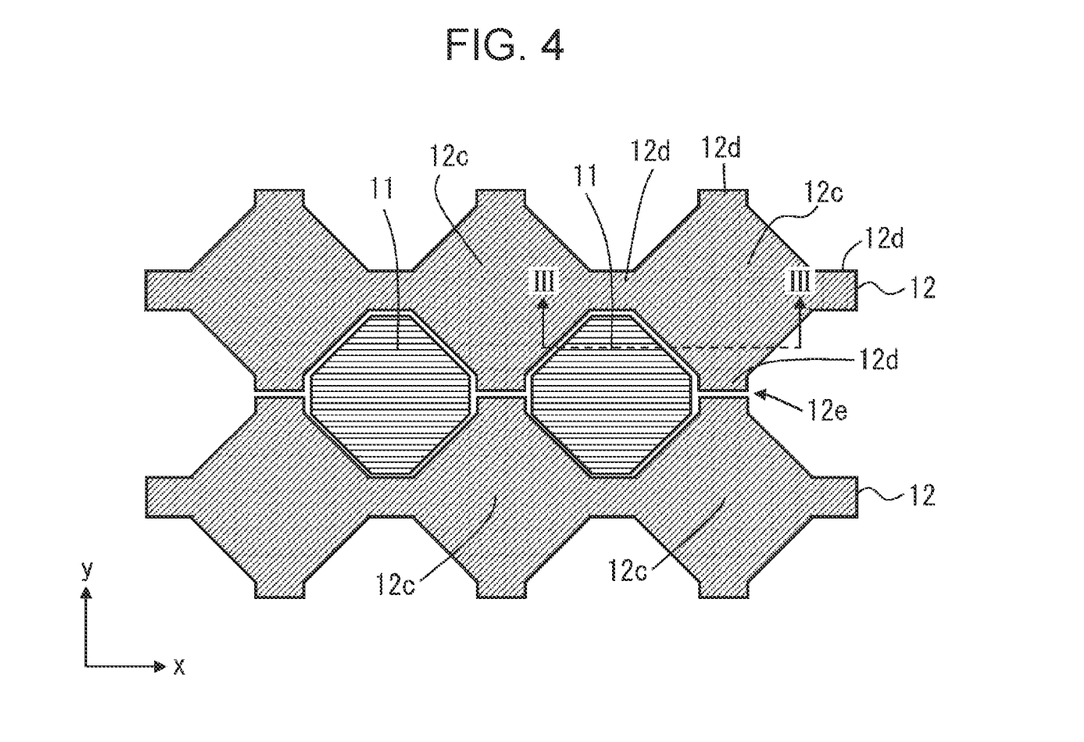
FIG. 4 is a plan view of the structure of electrodes included in the touch panel.
Figure 5:
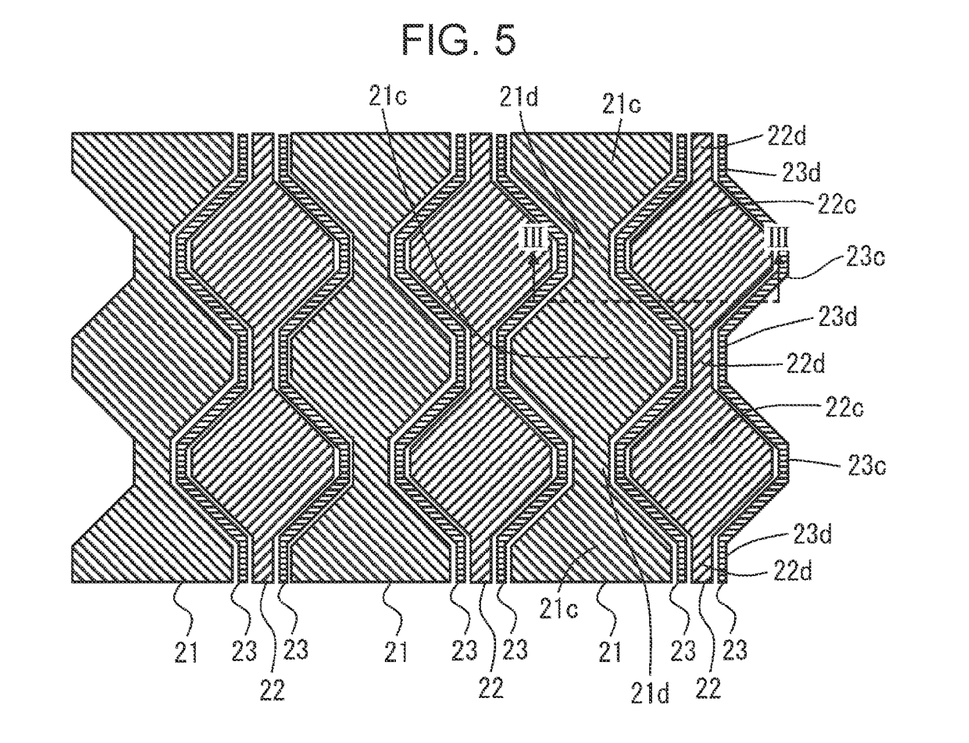
FIG. 5 is a plan view of the structure of the electrodes included in the touch panel.

FIG. 3 is a schematic illustration of an enlarged cross-sectional structure of the touch panel 101. FIGS. 4 and 5 are plan views of the structure of electrodes included in the touch panel 101. The position of the cross section illustrated in FIG. 3 is indicated by a line III-III in FIGS. 4 and 5.

The touch panel 101 includes a first substrate 10, a second substrate 20, a first dielectric layer 31, a plurality of drive electrodes 12, a plurality of floating island electrodes 11, a plurality of position detection electrodes 21, and a plurality of pressure detection electrodes 22. The touch panel 101 may further include a plurality of shield electrodes 23.

The first substrate 10 has a thin plate shape having a first principal surface 10a and a second principal surface 10b opposite to the first principal surface 10a. Similarly, the second substrate 20 has a thin plate shape having a first principal surface 20a and a second principal surface 20b opposite to the first principal surface 20a. The first substrate 10 and the second substrate 20 are disposed such that the second principal surface 10b of the first substrate 10 faces the first principal surface 20a of the second substrate 20.

The first substrate 10 and the second substrate 20 are made of transparent materials, such as glass or a polyethylene terephthalate (PET) film.

The first dielectric layer 31 is located between the first substrate 10 and the second substrate 20. The first dielectric layer 31 is made of a transparent material having elasticity and insulating properties. For example, one of various transparent polymer materials can be used for the first dielectric layer 31. More specifically, a material commercially available as OCA (Optical Clear Adhesive), OCR (Optical Clear Resin), or the like can be used. It is desirable that the first dielectric layer 31 do not have pyroelectricity.

The touch panel 101 is bonded to the display 410 with an adhesive layer 50, such as an OCA layer.

The plurality of drive electrodes 12 and the plurality of floating island electrodes 11 are located on the second principal surface 10b of the first substrate 10. As illustrated in FIG. 4, the plurality of drive electrodes 12 include, for example, a plurality of rhombic bases 12c arranged in a matrix in the row direction (the x-axis direction) and the column direction (the y-axis direction) and a plurality of connecting portions 12d each for connecting the bases 12c to each other in the row direction. The connecting portion 12d is cut by a slit 12e in the column direction. Therefore, in every adjacent two of the drive electrodes 12, the bases 12c are connected only in the row direction. The plurality of drive electrodes 12 each extending in the row direction are arranged in the column direction.

Each of the plurality of floating island electrodes 11 has, for example, an octagonal shape obtained by truncating four vertices of a rhombus and is disposed in one of a plurality of void spaces formed by the drive electrodes 12. That is, the plurality of floating island electrodes 11 are independent rhombic electrodes that are not connected to one another.

On the second principal surface 20b of the first substrate 10, each of the bases 12c of the drive electrodes 12 is surrounded by four adjacent floating island electrodes 11, and each of the floating island electrodes 11 is surrounded by the four adjacent bases 12c of the drive electrodes 12.

The plurality of position detection electrodes 21, the plurality of pressure detection electrodes 22, and the plurality of shield electrodes 23 are located on the first principal surface 20a of the second substrate 20. As illustrated in FIG. 5, the plurality of position detection electrodes 21 include a plurality of rhombic bases 21c arranged, for example, in a matrix in the row direction and the column direction and a plurality of connecting portions 21d each connecting adjacent two of the bases 21c to each other in the column direction. In each of the bases 21c, two vertices located on a diagonal line extending in the row direction are truncated.

The plurality of pressure detection electrodes 22 include a plurality of bases 22c arranged, for example, in a matrix in the row direction and the column direction and a plurality of connecting portions 22d each connecting adjacent two of the bases 22c to each other in the column direction.

The plurality of position detection electrodes 21 and the plurality of pressure detection electrodes 22 each extend in the column direction, and the plurality of position detection electrodes 21 and the plurality of pressure detection electrodes 22 are alternately arranged in the row direction. Each of the plurality of shield electrodes 23 has a zigzag shape extending in the column direction and is located between one of the position detection electrodes 21 and one of the pressure detection electrodes 22. That is, a pair of shield electrodes 23 are located on either side of one pressure detection electrode 22 in the row direction. Each of the shield electrodes 23 has a base 23c and a connecting portion 23d adjacent to the base 22c and the connecting portion 22d of the pressure detection electrode 22, respectively. One pressure detection electrode 22 and two shield electrodes 23 adjacent to the pressure detection electrode 22 in the row direction integrally have a shape so as to shift one of the position detection electrodes 21 by half a pitch in the row direction and the column direction.

Figure 6:
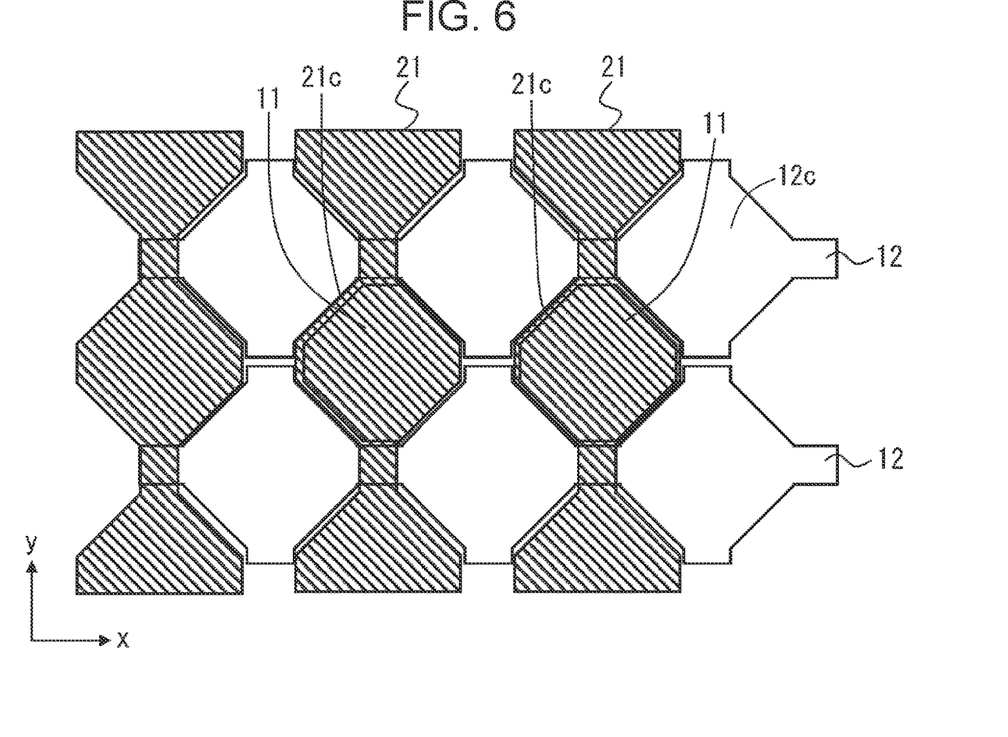
FIG. 6 is a plan view illustrating overlapping of each of a floating island electrode and a drive electrode and a position detection electrode in plan view.
Figure 7:
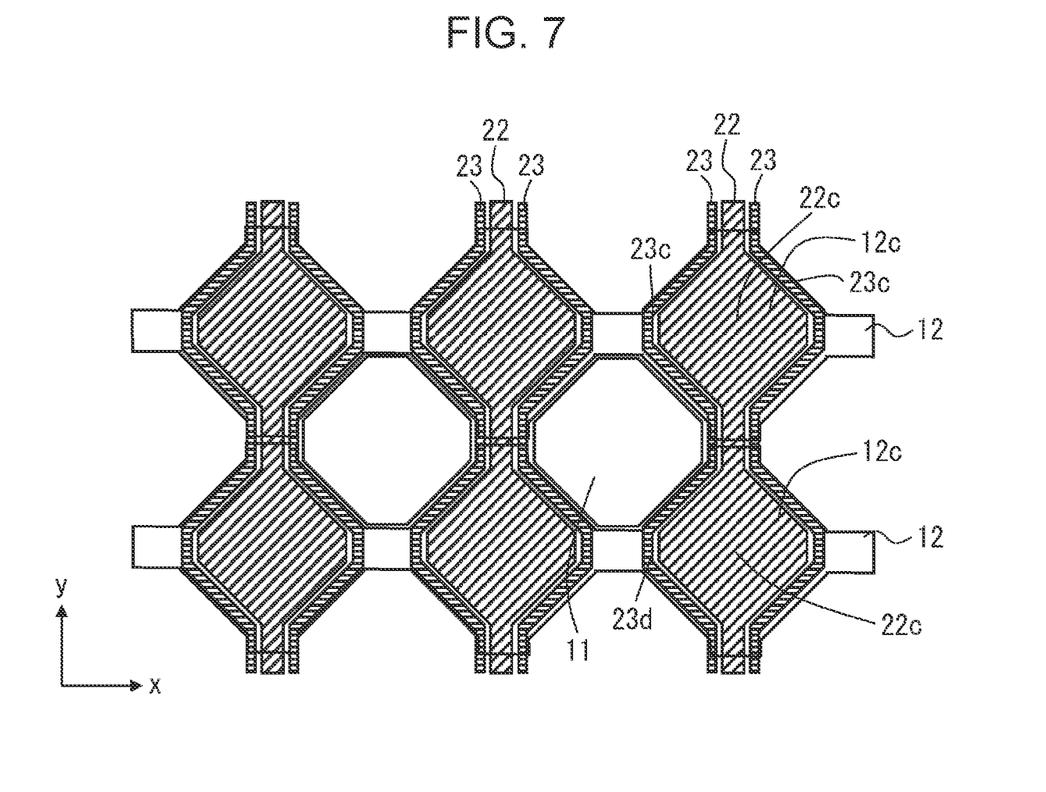
FIG. 7 is a plan view illustrating overlapping of each of the floating island electrode and the drive electrode and each of a pressure detection electrode and a shield electrode in plan view.

FIGS. 6 and 7 illustrate how the floating island electrode 11 and the drive electrode 12 located on the first substrate 10 overlap the position detection electrode 21, the pressure detection electrode 22, and the shield electrode 23 located on the second substrate 20 in plan view. As used herein, the term "plan view" refers to the view of these electrodes seen from a direction perpendicular to the first principal surface 10a of the first substrate 10.

In FIGS. 6 and 7, for ease of understanding, the floating island electrodes 11 and the drive electrodes 12 are not hatched and are illustrated in white. FIG. 6 does not illustrate the pressure detection electrode 22 and the shield electrode 23, and FIG. 7 does not illustrate the position detection electrode 21.

As illustrated in FIG. 6, each of the floating island electrodes 11 overlaps at least part of the position detection electrode 21. More specifically, each of the floating island electrodes 11 almost overlaps the base 21c of the position detection electrode 21. It is desirable that the base 12c of the drive electrode 12 do not overlap the position detection electrode 21. In addition, as illustrated in FIG. 7, the drive electrode 12 overlaps at least part of the shield electrode 23 and at least part of the pressure detection electrode 22. More specifically, the base 12c of the drive electrode 12 overlaps the base 23c of the shield electrode 23 and the base 22c of the pressure detection electrode 22. It is desirable that the area of the shield electrode 23 that overlaps the drive electrode 12 be less than the area of the pressure detection electrode 22 that overlaps the drive electrode 12. If the overlapping area of the pressure detection electrode 22 is large, the level of pressure applied by the pointer can be detected more accurately.

Configuration of Controller

Figure 8:
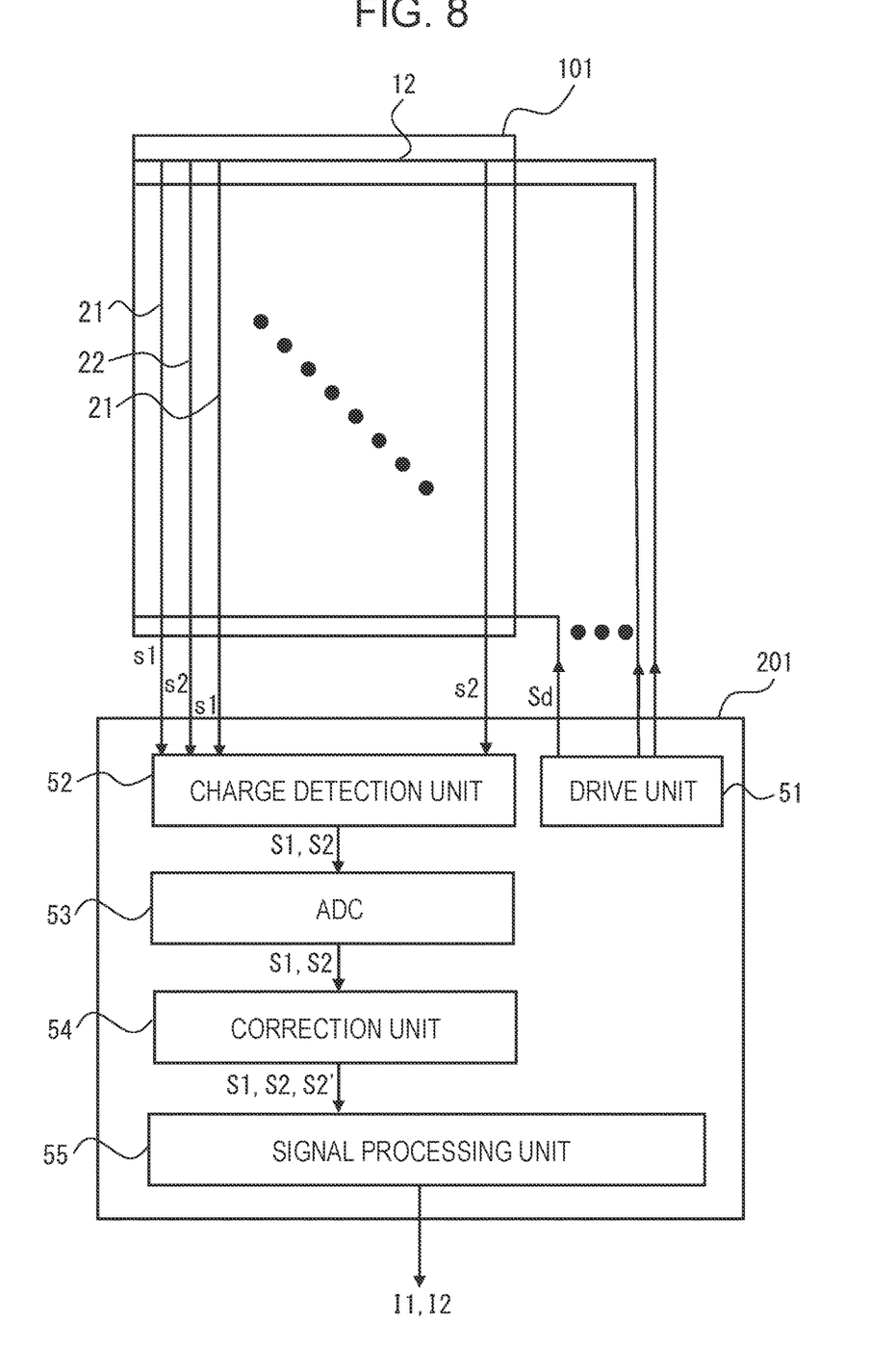
FIG. 8 is a block diagram of an example of a controller in the touch panel system according to the first embodiment.

FIG. 8 is a block diagram of an example of the controller 201. The controller 201 includes a drive unit 51, a charge detection unit 52, an analog to digital converter (ADC) 53, a correction unit 54, and a signal processing unit 55.

The drive unit 51 includes a function generator and the like. The drive unit 51 generates a drive signal Sd and applies the drive signal Sd to the plurality of drive electrodes 12. In addition, the shield electrode 23 is connected to a reference potential, such as ground potential.

The charge detection unit 52 receives the signal s1 output from each of the position detection electrodes 21 and the signal s2 output from each of the pressure detection electrodes 22. The signals s1 and s2 contain information about a change in capacitance due to the touch or heat of the pointer. The charge detection unit 52 converts the signals s1 and s2 into voltage values proportional to the values of capacitance or the changes in capacitance and outputs a position detection signal S1 and a pressure detection signal S2. That is, the charge detection unit 52 detects the signal s1 output from each of the position detection electrodes 21 and the signal s2 output from each of the pressure detection electrodes 22 and outputs the position detection signal S1 and the pressure detection signal S2. The position detection signal S1 and the pressure detection signal S2 are obtained from the position detection electrode 21 and the pressure detection electrode 22, respectively, by the charge detection unit 52. The charge detection unit 52 can be configured by, for example, a detection circuit such as a widely used integration circuit including an operational amplifier.

The ADC 53 includes, for example, a sample-and-hold circuit and an A/D converter. The ADC 53 receives the position detection signal S1 and the pressure detection signal S2 and converts the signals S1 and S2 into digital signals.

The correction unit 54 corrects the pressure detection signal S2 obtained from each of the pressure detection electrodes 22 on the basis of the position detection signal S1 obtained from the position detection electrodes 21 adjacent to the pressure detection electrode 22 and generates a corrected pressure detection signal S2'. Furthermore, the correction unit 54 holds the position detection signal S1 in a memory or the like and outputs the position detection signal S1 and the corrected pressure detection signal S2'. As described in detail below, the relative permittivity of the first dielectric layer 31 depends on the temperature. For this reason, when the touch panel 101 is affected by heat, a change in the relative permittivity of the first dielectric layer 31 may affect the change in capacitance to be detected.

According to the touch panel system of the present embodiment, by using the fact that the position detection signal S1 obtained from the position detection electrode 21 is also affected by heat, the influence of a change in the capacitance due to the heat on the pressure detection signal S2 is reduced on the basis of the position detection signal S1. For example, the corrected pressure detection signal S2' is generated by amplifying the position detection signal S1 and subtracting an amplified position detection signal S1' from the pressure detection signal S2.

The correction unit 54 may be configured by a logic circuit, such as a field programmable gate array (FPGA), or may be achieved by software as one of functions of the signal processing unit 55 (described below).

The signal processing unit 55 includes a microcomputer and a memory. The signal processing unit 55 receives the position detection signal S1 and the corrected pressure detection signal S2' and generates a two-dimensional map regarding the position of the pointer and the pressure level applied by the pointer. The generated two-dimensional map corresponds to the first principal surface 10a of the first substrate 10 of the touch panel. More specifically, the position detection map is generated from the position detection signal S1, and the pressure detection map is generated from the corrected pressure detection signals S2'. The signal processing unit 55 outputs the maps as the position information I1 and the pressure information I2. In addition, the signal processing unit 55 controls the drive unit 51, the charge detection unit 52, the ADC 53, and the correction unit 54.

Operation Performed by Touch Panel

Figure 9:
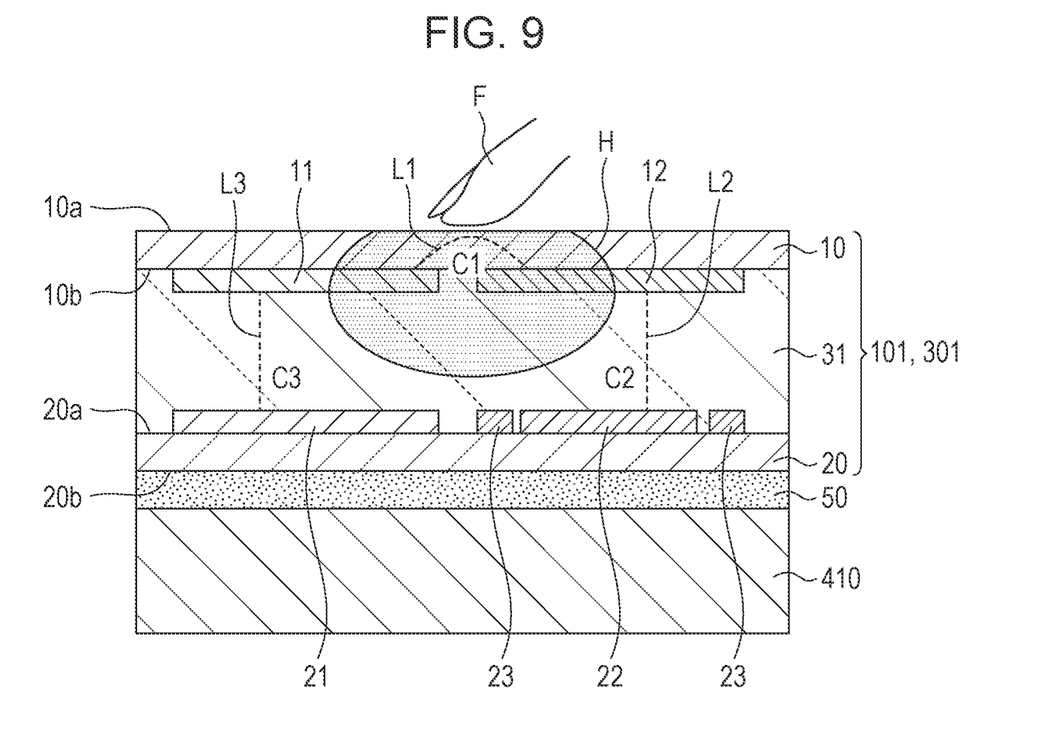
FIG. 9 is a schematic illustration of the lines of electric force corresponding to capacitive coupling that occurs between a pointer and a variety of electrodes.

The operation performed by the touch panel system 301 is described below with reference to FIG. 9. In FIG. 9, broken lines L1, L2, and L3 denote the lines of electric force corresponding to the capacitive coupling that occurs between a pointer F and a variety of electrodes and the capacitive coupling that occurs between the variety of electrodes. As illustrated in FIG. 9, when the pointer F touches the touch panel 101, the drive electrode 12 and the floating island electrode 11 are capacitively coupled by a capacitance C1, as indicated by the broken line L1. At this time, as indicated by the broken line L3, the floating island electrode 11 and the position detection electrode 21 are capacitively coupled by a capacitance C3. Therefore, the drive electrode 12 and the position detection electrode 21 are capacitively coupled via the floating island electrode 11. A combined capacitance C is a series connection of the capacitance C1 and the capacitance C3 and is given by $C=(C1 \cdot C3)/(C1+C3)$. Normally, the capacitance C1 formed between adjacent electrodes is less than the capacitance C3 formed by facing electrodes, so the capacitance C is less than the capacitance C3. For this reason, when the pointer F touches the touch panel 101, the capacitance between the drive electrode 12 and the position detection electrode 21 is reduced, and the signal s1 obtained from the position detection electrode 21, that is, the position detection signal S1 is changed.

Furthermore, as indicated by the broken line L2 in FIG. 9, the drive electrode 12 and the pressure detection electrode 22 are capacitively coupled by a capacitance C2. At this time, if a pressure (load) is applied to the first substrate 10 by the pointer F, the distance between the drive electrode 12 and the pressure detection electrode 22 is reduced at the pressed portion, since the first dielectric layer 31 is made of an elastic material. As a result, the capacitance C2 between the drive electrode 12 and the pressure detection electrode 22 increases, and the signal s2 obtained from the pressure detection electrode 22 and the pressure detection signal S2 change.

The drive electrode 12 is disposed so as to overlap the shield electrode 23 in plan view, and the shield electrode 23 is disposed between the position detection electrode 21 and the pressure detection electrode 22. Therefore, the lines of electric force emanating from an end of the drive electrode 12 are preferentially directed toward the shield electrode 23 and are less likely to reach the position detection electrode 21. That is, the drive electrode 12 is less likely to be directly capacitively coupled with the position detection electrode 21 without the floating island electrode 11 interposed therebetween. Therefore, the position detection signal S1 is less susceptible to a change in capacitance that occurs when the pointer F applies a load to the first substrate 10 and, thus, the drive electrode 12 is displaced toward the second substrate 20.

The influence of heat is described below. When the pointer F, which is a finger, touches the touch panel 101 and if the temperature of the touch panel 101, which is the ambient temperature, is lower than the temperature of the pointer F, heat is transferred from the pointer F to the first dielectric layer 31, as indicated by hatching H illustrated in FIG. 9. As a result, the temperature of the first dielectric layer 31 increases. When the dielectric is a polymeric material, the relative permittivity of the dielectric generally increases with increasing temperature.

Figure 10:
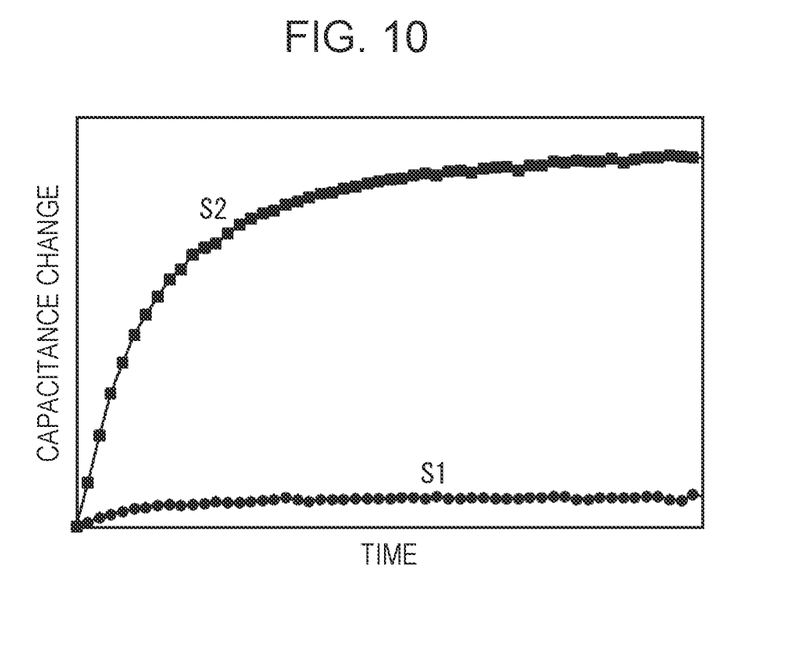
FIG. 10 is an example of measurement results of a position detection signal and a pressure detection signal detected by the position detection electrode and the pressure detection electrode, respectively, when the touch panel is touched by a pointer.

FIG. 10 illustrates examples of the pressure detection signal S2 detected by the pressure detection electrode 22 and the position detection signal S1 detected by the position detection electrode 21. These signals indicate changes in capacitance on the touch panel 101 detected by the pressure detection electrode 22 and the position detection electrode 21. The abscissa indicates the time, and the ordinate indicates the capacitance change with respect to the time when the pointer F touches the touch panel 101. The units of the abscissa and ordinate are any units.

The pressure detection signal S2 sharply increases after touch of the pointer F and, thereafter, approaches a certain value at which the rate of change decreases. This indicates that due to the touch of the pointer F on the first principal surface 10a of the first substrate 10, the temperature of the first dielectric layer 31 increases, and the relative permittivity of the first dielectric layer 31 between the drive electrode 12 and the pressure detection electrode 22 increases, causing the capacitance C2 to increase. As described above, if the temperature of the first dielectric layer 31 increases, the capacitance changes even though the pointer F does not press the first substrate 10, and the pressure detection signal S2 obtained from the pressure detection electrode 22 changes.

In contrast, the position detection signal S1 obtained from the position detection electrode 21 depends on the combined capacitance C of the series-connected capacitance C1 and capacitance C3. The touch of the pointer F on the touch panel 101 increases the temperatures of the first substrate 10 and the first dielectric layer 31 and, thus, the relative permittivity of the materials of the first dielectric layer 31 and the first substrate 10 forming part of the capacitance C1 also changes. However, since the floating island electrode 11 and the drive electrode 12 do not face each other, the change in the relative permittivity of the materials has little effect on the capacitance C1. As a result, as illustrated in FIG. 10, the change in the position detection signal S1 is less than the change in the pressure detection signal S2.

As can be seen from FIG. 10, the position detection signal S1 and the pressure detection signal S2 change almost at the same time and exhibit similar tendencies. This is because both the position detection signal S1 and the pressure detection signal S2 are influenced by the heat transferred from the pointer F almost at the same time, although the magnitudes of the influences are different. Therefore, by adjusting the amplitudes of the position detection signal S1 and the pressure detection signal S2 so that the influences of the changes in capacitance due to heat are substantially the same, the influence of the heat due to touch of the pointer F can be reduced.

Figure 11:
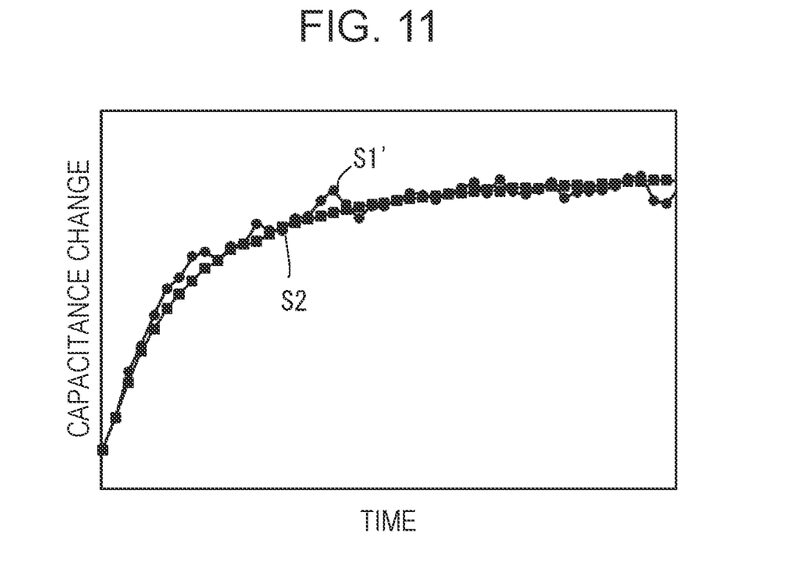
FIG. 11 illustrates a signal obtained by amplifying the position detection signal illustrated in FIG. 10 and the pressure detection signal.

FIG. 11 illustrates the pressure detection signal S2 and the amplified position detection signal S1' obtained by amplifying the position detection signal S1 by 13 times. As can be seen in FIG. 11, the change in the amplified position detection signal S1' is almost the same as the change in the pressure detection signal S2.

Figure 12:
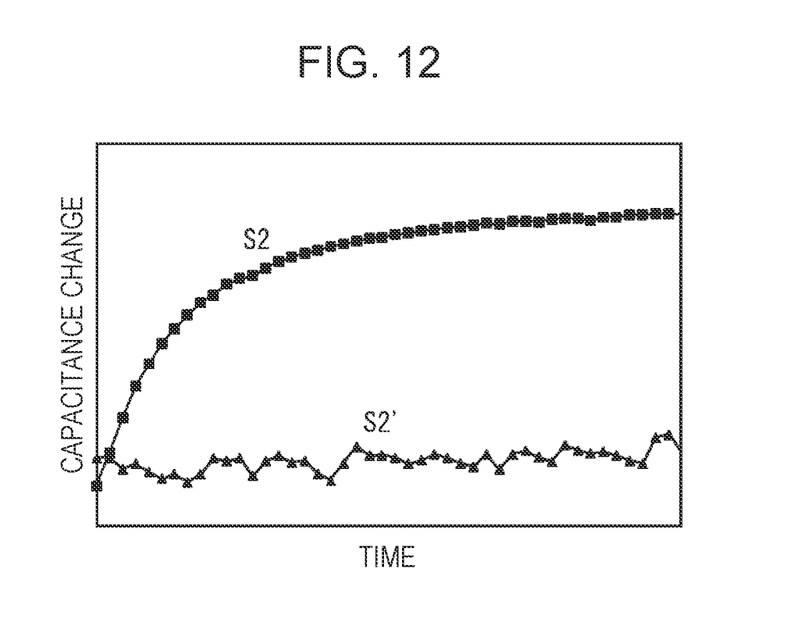
FIG. 12 illustrates the pressure detection signal illustrated in FIG. 10 and a pressure detection signal corrected using the position detection signal.

FIG. 12 illustrates the pressure detection signal S2 and the corrected pressure detection signal S2' obtained by subtracting the amplified position detection signal S1' from the pressure detection signal S2. As illustrated in FIG. 12, an increase in capacitance due to heat is reduced. From this, it can be seen that the influence of heat can be reduced by correcting the pressure detection signal S2 using the position detection signal S1. The amplification ratio, that is, the amplification factor of the position detection signal S1 can be determined so that the influence of heat on the pressure detection signal S2 is minimized. If the detection of the level of touch by the pointer is canceled out in the pressure detection signal S2 by performing the above-described correction, the amplification factor may be set small so as to maintain the sufficient detection sensitivity. The amplification factor depends on the shapes, arrangement, and areas of the electrodes in the touch panel 101 and the thickness and the relative permittivity of each of the members of the touch panel, such as the first substrate 10, the second substrate 20, and the first dielectric layer 31 that are made of an insulating material. Therefore, the amplification factor can be appropriately determined on the basis of simulation, actual measurement, or the like.

As described above, according to the touch panel system of the present embodiment, it is possible to detect both the position of the pointer F and the level of the pressure applied by the pointer F through a capacitive method not using a pyroelectric body. Moreover, when the temperature difference between a pointer and a touch panel is large, the influence of the temperature of the pointer on the detection of pressure can be reduced.

Furthermore, according to the touch panel system of the present embodiment, since the pressure detection signal S2 is corrected by using the position detection signal S1 detected at the same time, it is possible to properly correct the rapid influence of heat (noise). For example, Japanese Unexamined Patent Application Publication No. 2012-43394 describes that in an in-cell touch panel, a moving average of touch panel detection signals obtained periodically is calculated to reduce noise due to a display drive signal. When such a noise reduction method is used to reduce the influence of a change in electric permittivity due to heat, it is difficult to accurately reduce the influence of heat because rapid changes in the relative permittivity are averaged over time. In addition, by averaging, a change in the change in electric permittivity has an effect for a long period of time. From this point of view, the touch panel system according to the present embodiment can reduce the influence of the heat of a finger and the environment more effectively.

Second Embodiment

Figure 13:
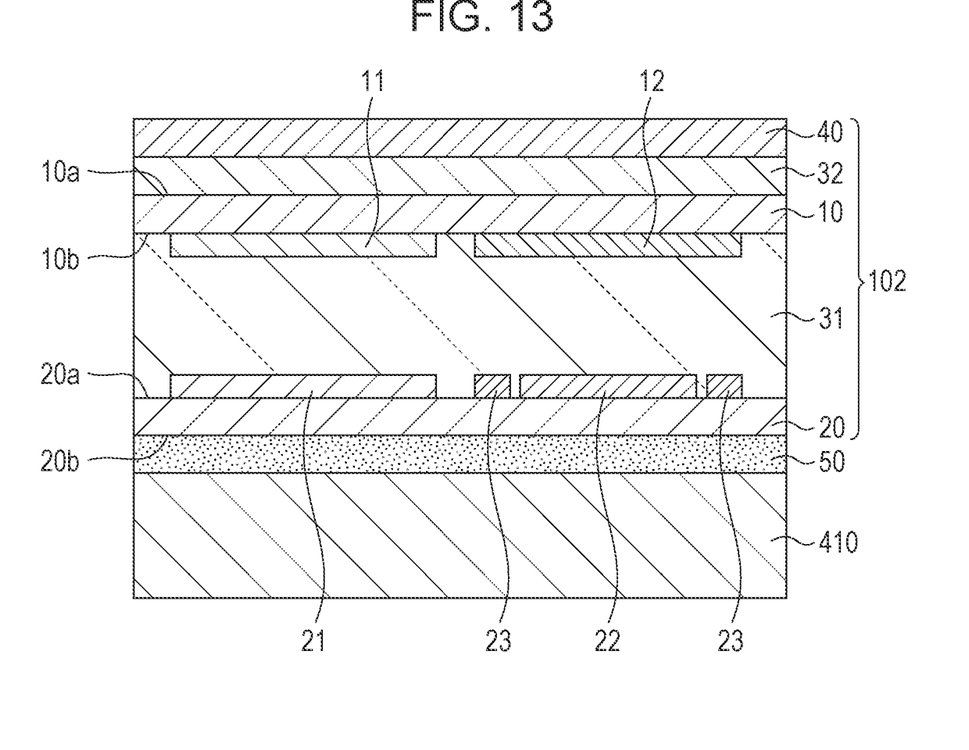
FIG. 13 is a schematic illustration of an enlarged cross-sectional structure of a touch panel according to a second embodiment.

FIG. 13 is an enlarged cross-sectional view of a touch panel of a touch panel system according to the second embodiment. Unlike the touch panel 101 and the touch panel system 301 according to the first embodiment, a touch panel 102 in the touch panel system according to the present embodiment further includes a cover layer 40 and a second dielectric layer 32. The cover layer 40 is located adjacent to the first principal surface 10a of the first substrate 10. The second dielectric layer 32 is located between the cover layer 40 and the first substrate 10.

The cover layer 40 is located on the outermost surface of the touch panel 102 and protects the surface of the touch panel 102. The cover layer 40 is made of a transparent material, such as resin or glass.

The second dielectric layer 32 is located adjacent to the first principal surface 10a of the first substrate 10 and, therefore, the second dielectric layer 32 can adjust the capacitance that affects the position detection signal S1 obtained from the position detection electrode 21. The second dielectric layer 32 may also function as an adhesive that bonds the cover layer 40 to the first substrate 10.

The second dielectric layer 32 may be made of the same material as the first dielectric layer 31. If the second dielectric layer 32 and the first dielectric layer 31 are made of the same material, the temperature characteristic of the relative permittivity, which is a change in the relative permittivity caused by the heat conducted from the pointer when the pointer touches the touch panel, is the same for the first dielectric layer 31 and the second dielectric layer 32. For this reason, the influence of the heat on the pressure detection signal S2 can be reduced more accurately by amplifying the position detection signal S1 and subtracting an amplified position detection signal S1' from the pressure detection signal S2.

Figure 14:
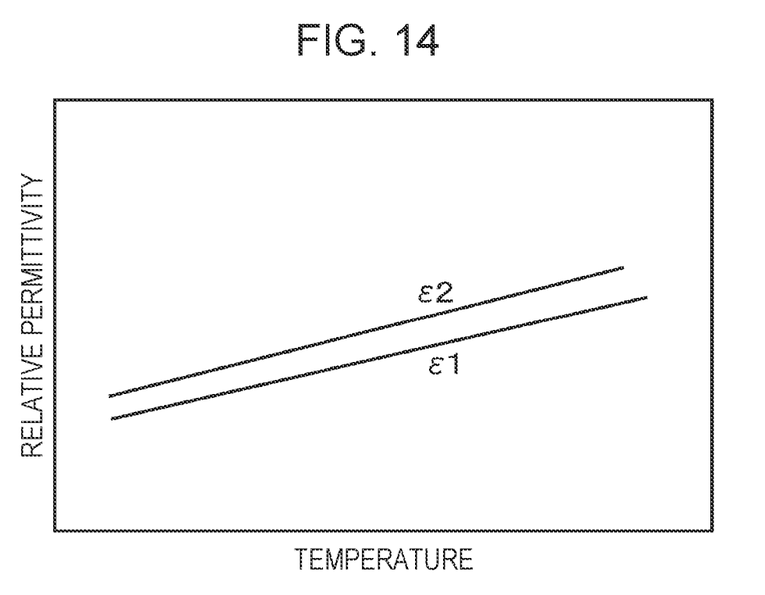
FIG. 14 is a schematic illustration of the temperature dependencies of the relative permittivity of a first dielectric layer and a second dielectric layer according to the second embodiment.

The second dielectric layer 32 may be made of a material different from that of the first dielectric layer 31. When the first dielectric layer 31 is made of a first material and the second dielectric layer 32 is made of a second material and if the second material is different from the first material, it is desirable that the change tendencies of the relative permittivity of the first and second materials with respect to the temperature be the same. For example, as illustrated in FIG. 14, if the first material has a temperature characteristic s1 in which the value of its relative permittivity increases with increasing temperature, it is desirable that the second material have a temperature characteristic s2 in which the value of its relative permittivity increases with increasing temperature. The temperature characteristic of the relative permittivity is not limited to a linear function and may be a quadratic function or the like. Moreover, if the temperature characteristic s1 and the temperature characteristic s2 are linear functions, the slopes may differ from each other. Even if the first material and the second material are different, the influence of heat on the pressure detection signal S2 can be reduced by using the position detection signal S1, since the tendency of change in the relative permittivity with respect to temperature is the same.

If the second dielectric layer 32 is made of a material different from that of the first dielectric layer 31, it is desirable that the second material have a higher modulus of elasticity than the first material. Thus, when a load is applied to the touch panel 102 by the pointer, the first dielectric layer 31 deforms more than the second dielectric layer 32, so that the amount of displacement of the drive electrode 12 increases. In this way, the amount of change in the pressure detection signal S2 can be increased.

Third Embodiment

Figure 15:
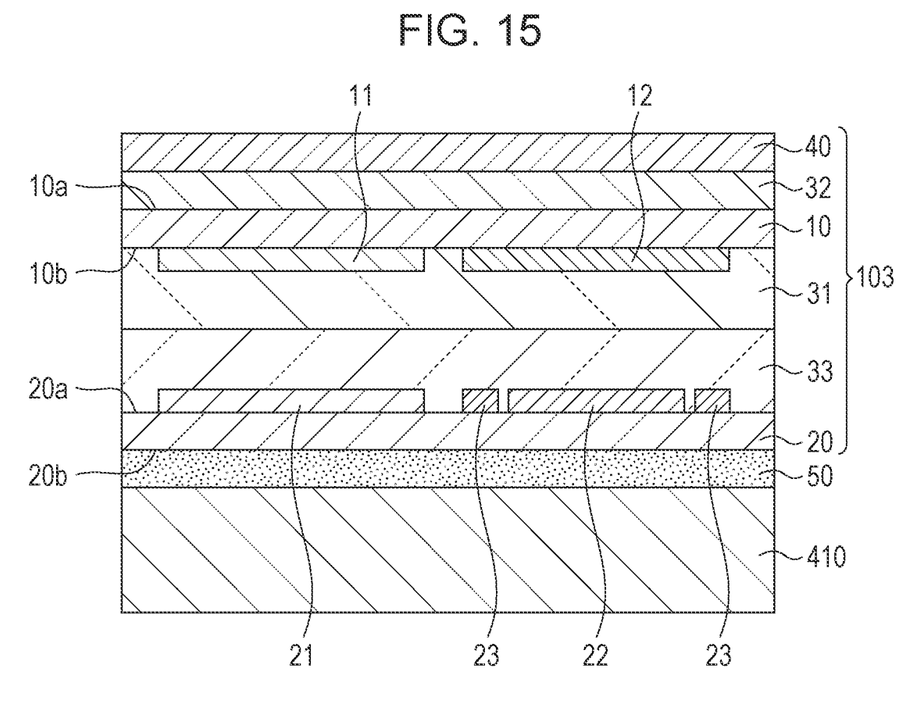
FIG. 15 is a schematic illustration of an enlarged cross-sectional structure of a touch panel according to a third embodiment.

FIG. 15 is an enlarged cross-sectional view of a touch panel of a touch panel system according to the third embodiment. Unlike the touch panel 102 and the touch panel system according to the second embodiment, a touch panel 103 of the touch panel system according to the present embodiment further includes a third dielectric layer 33. The third dielectric layer 33 is located, for example, between the first dielectric layer 31 and the second substrate 20. The third dielectric layer 33 is made of a third material. It is desirable that the third material differ from the first material and that the first material and the third material have opposite tendencies of relative permittivity with respect to the temperature.

Figure 16:
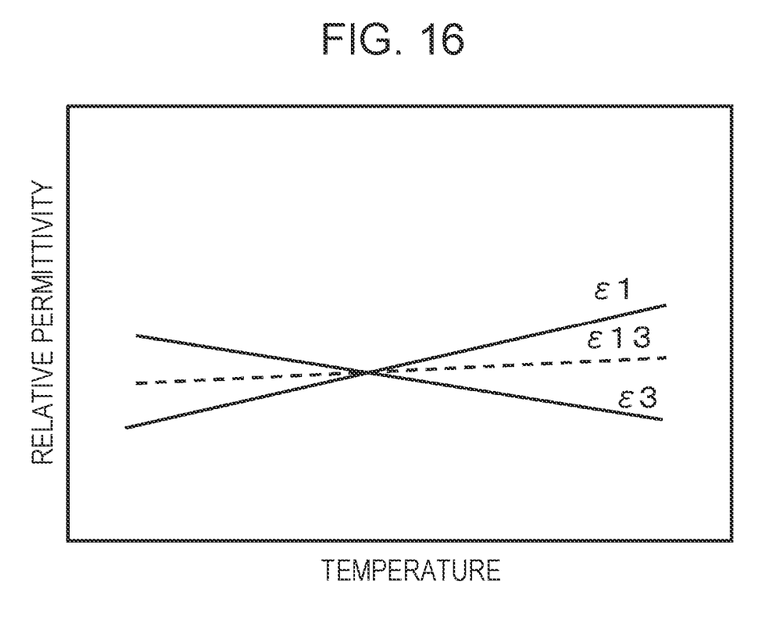
FIG. 16 is a schematic illustration of the temperature dependencies of the relative permittivity of a first dielectric layer and a third dielectric layer according to the third embodiment.

For example, as illustrated in FIG. 16, if the first material has a temperature characteristic s1 in which the value of the relative permittivity increases with increasing temperature, it is desirable that the third material have a temperature characteristic s3 that the value of the relative permittivity decreases with increasing temperature. Since the change tendencies of relative permittivity are reversed from each other, at least part of the change in the relative permittivity caused by an increase or a decrease in the temperature can be canceled out in the stacked structure in which the first dielectric layer 31 and the third dielectric layer 33 are stacked. Therefore, as indicated by a broken line in FIG. 16, a temperature characteristic ε13 of the stacked structure in which the first dielectric layer 31 and the third dielectric layer 33 are stacked exhibits a small increase or decrease in relative permittivity with increasing temperature. As a result, when the pressure detection signal S2 is corrected using the position detection signal S1, the magnification factor to amplify the position detection signal S1 can be reduced, and the influence of heat on the pressure detection signal S2 can be reduced more accurately.

Fourth Embodiment

Figure 17:
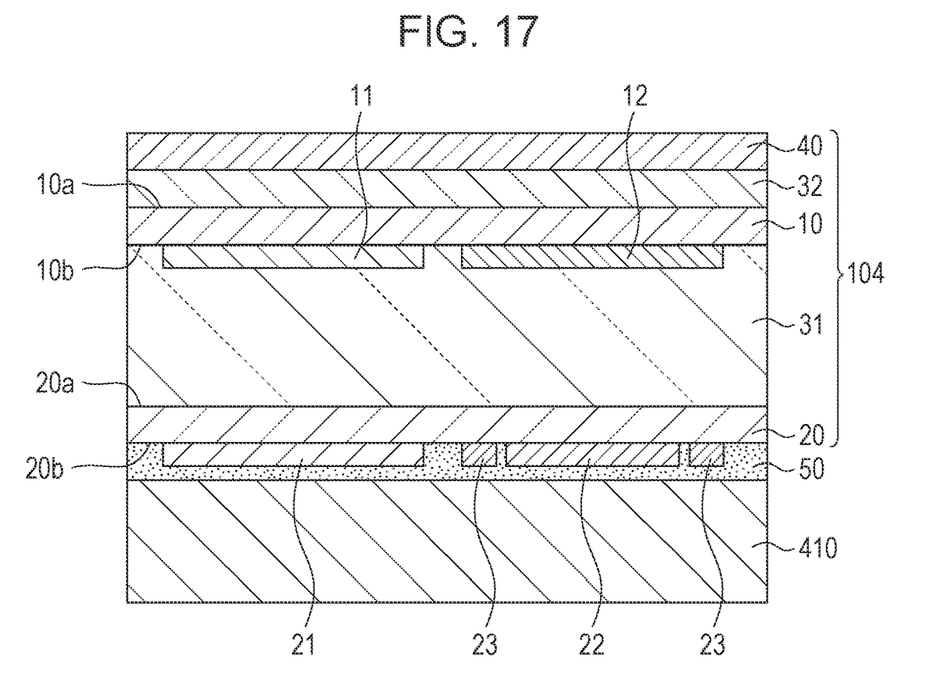
FIG. 17 is a schematic illustration of an enlarged cross-sectional structure of a touch panel according to a fourth embodiment.
Figure 18:
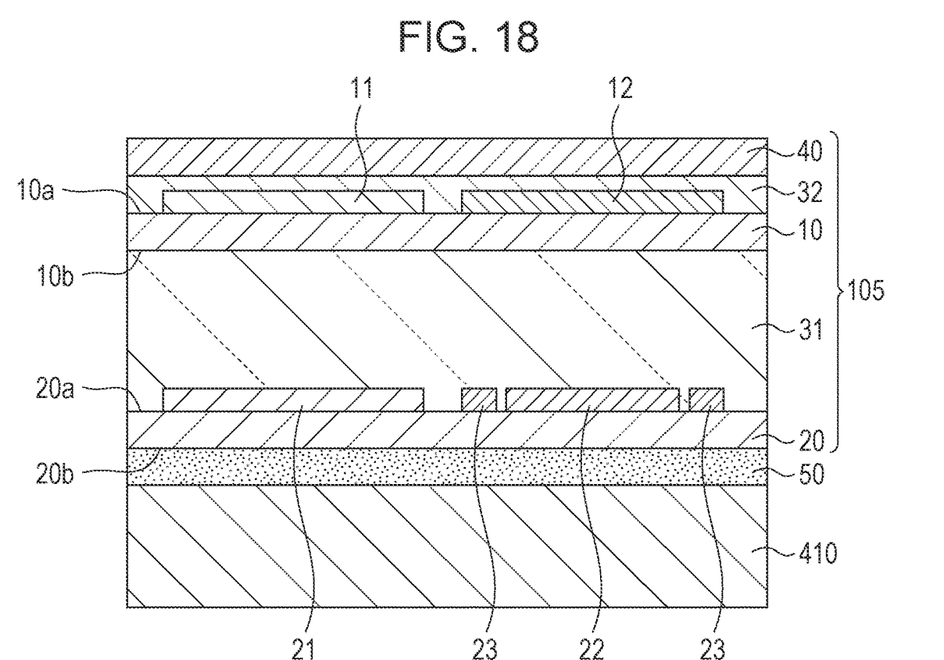
FIG. 18 is a schematic illustration of an enlarged cross-sectional structure of a touch panel according to the fourth embodiment.

FIGS. 17 and 18 are enlarged cross-sectional views of touch panels of touch panel systems according to the fourth embodiment. The locations of the floating island electrode 11, the drive electrode 12, the position detection electrode 21, the pressure detection electrode 22, and the shield electrode 23 in a touch panel 104 illustrated in FIG. 17 and a touch panel 105 illustrated in FIG. 18 differ from those in the touch panel 101 according to the first embodiment. More specifically, in the touch panel 104 illustrated in FIG. 17, the position detection electrode 21, pressure detection electrode 22, and shield electrode 23 are located on the second principal surface 20b of the second substrate 20. In the touch panel 105 illustrated in FIG. 18, the floating island electrode 11 and the drive electrode 12 are located on the first principal surface 10a of the first substrate 10.

As described in detail in the first embodiment, even in the touch panel system including the touch panel 104 and the touch panel system including the touch panel 105, when the temperature difference between a pointer and the touch panel is large, the influence of the temperature of the pointer on the detection of the pressure can be reduced.

Other Embodiments

The touch panel, the touch panel system, and a method for controlling a touch panel according to the present disclosure are not limited to the above embodiments, and various modifications can be made. For example, the controller may perform signal processing in a different manner than described in the above-described embodiments. Furthermore, the shapes of the drive electrode, the floating island electrode, the position detection electrode, the pressure detection electrode, and the shield electrode illustrated in the above embodiments are only examples, and these electrodes may have other shapes.

In addition, the above embodiments have been described with reference to an example in which the relative permittivity of the dielectric layer increases as a finger approaches the touch panel. However, the touch panel system according to the present disclosure can reduce the influence of heat even when the relative permittivity of the dielectric layer decreases due to the approach of a finger, that is, the approach of a pointer having a temperature higher than that of the touch panel.

The touch panel system, the display device, and the method for controlling a touch panel according to the present disclosure can also be described as follows.

According to a first configuration, a touch panel system includes a capacitive touch panel and a controller configured to control the touch panel. The touch panel includes a first substrate, a second substrate, a first dielectric layer located between the first substrate and the second substrate, a plurality of drive electrodes located on the first substrate, a plurality of floating island electrodes located on the first substrate, a plurality of pressure detection electrodes located on the second substrate, and a plurality of position detection electrodes located on the second substrate. Each of the drive electrodes overlaps at least part of a corresponding one of the pressure detection electrodes, and each of the floating island electrodes overlaps at least part of a corresponding one of the position detection electrodes in plan view. The controller provides a drive signal to the drive electrodes and corrects a pressure detection signal obtained from each of the pressure detection electrodes by using a position detection signal obtained from the position detection electrode.

According to the first configuration, the touch panel system can detect both the position of the pointer and the level of the pressure applied by the pointer by employing the capacitive method not using a pyroelectric body. In addition, by correcting the pressure detection signal on the basis of the position detection signal detected by the position detection electrode, it is possible to reduce the influence of heat due to the use environment and the pointer, which achieves a touch panel system that can operate with high accuracy.

According to a second configuration, in the touch panel system according to the first configuration, the controller may include a drive unit, a charge detection unit, and a correction unit. The drive unit may generate the drive signal. The charge detection unit may generate the position detection signal and the pressure detection signal from the position detection electrode and the pressure detection electrode, respectively. The correction unit may correct the pressure detection signal on the basis of the position detection signal and generate a corrected pressure detection signal.

According to a third configuration, in the touch panel system according to the second configuration, the correction unit may amplify the position detection signal and subtract the amplified position detection signal from the pressure detection signal so as to generate the corrected pressure detection signal.

According to a fourth configuration, in the touch panel system according to the third configuration, the controller may further include a signal processing unit. The signal processing unit may receive the position detection signal and the corrected pressure detection signal from the correction unit and generate two-dimensional position detection information and pressure detection information.

According to a fifth configuration, in the touch panel system according to any one of the first to fourth configurations, the touch panel may further include a plurality of shield electrodes located on the first substrate. The position detection electrodes, the pressure detection electrodes, and the shield electrodes each may extend in the column direction. The position detection electrodes and the pressure detection electrodes may be alternately arranged in the row direction, and each of the shield electrodes may be disposed between one of the pressure detection electrodes and one of the position detection electrodes. Since the shield electrodes are provided, the occurrence of direct capacitive coupling between the position detection electrode and the drive electrode can be reduced and, thus, the position detection electrode is unlikely to detect a capacitance change caused by the pointer pressing the touch panel.

According to a sixth configuration, in the touch panel system according to any one of the first to fifth configuration, each of the first substrate and the second substrate may have a first principal surface and a second principal surface opposite to the first principal surface, and the first dielectric layer may be located between the second principal surface of the first substrate and the first principal surface of the second substrate.

According to a seventh configuration, in the touch panel system according to the sixth configuration, the touch panel may further include a cover layer located adjacent to the first principal surface of the first substrate and a second dielectric layer located between the cover layer and the first substrate.

According to an eighth configuration, in the touch panel system according to the seventh configuration, the first dielectric layer and the second dielectric layer may be made of the same material. This makes it possible to more accurately reduce the influence of heat on the pressure detection signal.

According to a ninth configuration, in the touch panel system according to the seventh configuration, the first dielectric layer may be made of a first material, and the second dielectric layer may be made of a second material. The second material may differ from the first material, and the change tendencies of relative permittivity of the second material and the first material with respect to a temperature may be the same. This makes it possible to more accurately reduce the influence of heat on the pressure detection signal.

According to a tenth configuration, in the touch panel system according to the ninth configuration, the second material may have a greater modulus of elasticity than the first material. This makes it possible to more accurately detect the load applied by the pointer.

According to an eleventh configuration, in the touch panel system according to any one of the first to sixth configurations, the touch panel may further include a third dielectric layer located between the first dielectric layer and the second substrate. The first dielectric layer may be made of a first material, and the third dielectric layer may be made of a third material. The third material may differ from the first material, and change tendencies of relative permittivity of the first material and the third material with respect to a temperature may be reversed from each other. This makes it possible to more accurately reduce the influence of heat on the pressure detection signal.

According to a twelfth configuration, in the touch panel system according to any one of the sixth to ninth configurations, the drive electrodes and the floating island electrodes may be located on the second principal surface of the first substrate, and the pressure detection electrodes and the position detection electrodes may be located on the first principal surface of the second substrate.

According to a thirteenth configuration, in the touch panel system according to any one of the sixth to ninth configurations, the drive electrodes and the floating island electrodes may be located on the second principal surface of the first substrate, and the pressure detection electrodes and the position detection electrodes may be located on the second principal surface of the second substrate.

According to a fourteenth configuration, in the touch panel system according to any one of the sixth to ninth configurations, the drive electrodes and the floating island electrodes may be located on the first principal surface of the first substrate, and the pressure detection electrodes and the position detection electrodes may be located on the first principal surface of the second substrate.

According to a fifteenth configuration, a display device includes the touch panel system according to any one of the first to fourth configurations and a display configured to display an image. The touch panel is disposed on a display surface of the display. According to the display device of the fifteenth configuration, a display device is achieved capable of reducing the influence of heat and performing highly accurate detection even at a variety of ambient temperatures when the surface of the touch panel display device is touched with a pointer.

According to a sixteenth configuration, a method for controlling a touch panel is provided. The touch panel is a capacitive touch panel. The touch panel includes a first substrate, a second substrate, a first dielectric layer located between the first substrate and the second substrate, a plurality of drive electrodes located on the first substrate, a plurality of floating island electrodes located on the first substrate, a plurality of pressure detection electrodes located on the second substrate, and a plurality of position detection electrodes located on the second substrate. Each of the drive electrodes overlaps at least part of a corresponding one of the pressure detection electrodes, and each of the floating island electrodes overlaps at least part of a corresponding one of the position detection electrodes in plan view. The method includes providing a drive signal to the drive electrodes and correcting a pressure detection signal obtained from each of the pressure detection electrodes by using a position detection signal obtained from the position detection electrode.

According to the method for controlling a touch panel of the sixteenth configuration, it is possible to detect both the position of the pointer and the level of the pressure applied by the pointer by using a capacitive method that does not use a pyroelectric body. In addition, by correcting the pressure detection signal on the basis of the position detection signal detected by the position detection electrode, control of a touch panel is achieved capable of reducing the influence of heat due to the use environment and the pointer and providing a highly accurate operation.

The touch panel, the touch panel system, and the method for controlling a touch panel according to the present disclosure can be used for touch panels for various applications and be suitably used for smartphones, tablets, automobile dashboards, car navigation systems, and the like.

The present disclosure contains subject matter related to that disclosed in Japanese Priority Patent Application JP 2022-060997 filed in the Japan Patent Office on Mar. 31, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A touch panel system comprising:
a capacitive touch panel; and
control circuitry to control the capacitive touch panel, wherein:
the capacitive touch panel includes includes:

a first substrate, a second substrate,
a first dielectric layer located between the first substrate and the second substrate,
a plurality of drive electrodes located on the first substrate,
a plurality of floating island electrodes located on the first substrate,
a plurality of pressure detection electrodes located on the second substrate, and
a plurality of position detection electrodes located on the second substrate,
each of the plurality of drive electrodes overlaps at least part of a corresponding one of the plurality of pressure detection electrodes, and each of the plurality of floating island electrodes overlaps at least part of a corresponding one of the plurality of position detection electrodes in plan view,
the control circuitry further provides a drive signal to the plurality of drive electrodes and corrects a pressure detection signal obtained from each of the plurality of pressure detection electrodes by using a position detection signal obtained from a position detection electrode, among the plurality of position detection electrodes, that is adjacent to the each of the plurality of pressure detection electrodes,
the control circuitry includes a drive unit, a charge detection unit, and a correction unit,
the drive unit generates the drive signal,
the charge detection unit generates the position detection signal and the pressure detection signal from the position detection electrode and each of the plurality of pressure detection electrodes,
the correction unit corrects the pressure detection signal based on the position detection signal and generates a corrected pressure detection signal, and
the correction unit amplifies the position detection signal and subtracts the amplified position detection signal from the pressure detection signal so as to generate the corrected pressure detection signal.

2. The touch panel system according to claim 1, wherein the control circuit further includes a signal processing unit, and
wherein the signal processing unit receives the position detection signal and the corrected pressure detection signal from the correction unit and generates two-dimensional position detection information and pressure detection information.

3. The touch panel system according to claim 1, wherein each of the first substrate and the second substrate has a first principal surface and a second principal surface opposite the first principal surface, and
wherein the first dielectric layer is located between the second principal surface of the first substrate and the first principal surface of the second substrate.

4. The touch panel system according to claim 3, wherein the capacitive touch panel further includes a cover layer located adjacent to the first principal surface of the first substrate and a second dielectric layer located between the cover layer and the first substrate.

5. The touch panel system according to claim 4, wherein the first dielectric layer and the second dielectric layer are made of the same material.

6. The touch panel system according to claim 4, wherein the first dielectric layer is made of a first material, and the second dielectric layer is made of a second material,
wherein the second material is different from the first material, and
wherein change tendencies of relative permittivity of the second material and the first material with respect to a temperature are the same.

7. The touch panel system according to claim 6, wherein the second material has a greater modulus of elasticity than the first material.

8. The touch panel system according to claim 3, wherein the plurality of drive electrodes and the plurality of floating island electrodes are located on the second principal surface of the first substrate, and
wherein the plurality of pressure detection electrodes and the plurality of position detection electrodes are located on the first principal surface of the second substrate.

9. The touch panel system according to claim 3, wherein the plurality of drive electrodes and the plurality of floating island electrodes are located on the second principal surface of the first substrate, and
wherein the plurality of pressure detection electrodes and the plurality of position detection electrodes are located on the second principal surface of the second substrate.

10. The touch panel system according to claim 3, wherein the plurality of drive electrodes and the plurality of floating island electrodes are located on the first principal surface of the first substrate, and
wherein the plurality of pressure detection electrodes and the plurality of position detection electrodes are located on the first principal surface of the second substrate.

11. The touch panel system according to claim 1, wherein the capacitive touch panel further includes a third dielectric layer located between the first dielectric layer and the second substrate,
wherein the first dielectric layer is made of a first material, and the third dielectric layer is made of a third material, and
wherein the third material is different from the first material, and change tendencies of relative permittivity of the first material and the third material with respect to a temperature are reversed from each other.

12. A display device comprising:
the touch panel system according to claim 1; and
a display configured to display an image,
wherein the capacitive touch panel is disposed on a display surface of the display.

13. A touch panel system comprising:
a capacitive touch panel; and
control circuitry to control the capacitive touch panel,
wherein:
the capacitive touch panel includes:
a first substrate, a second substrate,
a first dielectric layer located between the first substrate and the second substrate,
a plurality of drive electrodes located on the first substrate,
a plurality of floating island electrodes located on the first substrate,
a plurality of pressure detection electrodes located on the second substrate,
a plurality of position detection electrodes located on the second substrate, and
a plurality of shield electrodes located on the first substrate,
each of the plurality of drive electrodes overlaps at least part of a corresponding one of the plurality of pressure detection electrodes, and each of the plurality of floating island electrodes overlaps at least part of a corresponding one of the plurality of position detection electrodes in plan view, the control circuitry further provides a drive signal to the plurality of drive electrodes and corrects a pressure detection signal obtained from each of the plurality of pressure detection electrodes by using a position detection signal obtained from a position detection electrode, among the plurality of position detection electrodes, that is adjacent to the each of the plurality of pressure detection electrodes, the plurality of position detection electrodes, the plurality of pressure detection electrodes, and the plurality of shield electrodes, each extends in a column direction, the plurality of position detection electrodes and the plurality of pressure detection electrodes are alternately arranged in a row direction, and each of the plurality of shield electrodes is disposed between one of the plurality of pressure detection electrodes and one of the plurality of position detection electrodes.

\* \* \* \* \*